United States Patent [19]

Wey et al.

[11] 4,279,402
[45] Jul. 21, 1981

[54] EXPLOSION BARRING SHUTOFF DEVICE

[75] Inventors: Joseph Wey, Lucerne; Hans Sidler; Hans Stalder, both of Eschenbach, all of Switzerland

[73] Assignee: Sistag, Maschinenfabrik Sidler Stalder AG, Switzerland

[21] Appl. No.: 133,391

[22] Filed: Mar. 24, 1980

[30] Foreign Application Priority Data

Apr. 5, 1979 [CH] Switzerland .................. 3173/79

[51] Int. Cl.³ ................ F16K 31/122; F16K 51/00
[52] U.S. Cl. .................................. 251/63; 92/85 R; 173/139; 188/1 C; 188/207; 251/63.5; 251/284; 251/326
[58] Field of Search ............... 92/85 R; 251/76, 62, 251/63, 63.5, 63.6, 326, 327, 328, 284; 173/131, 139; 181/207; 188/1 C

[56] References Cited

U.S. PATENT DOCUMENTS

| 1,769,386 | 7/1930 | Orton | 251/326 |
|---|---|---|---|
| 2,010,129 | 8/1935 | Baker | 251/284 |
| 2,925,241 | 2/1960 | Baldwin | 251/301 |
| 3,053,231 | 9/1962 | Fairchild | 173/139 |
| 3,321,033 | 5/1967 | Benuska et al. | 173/139 |
| 3,687,017 | 8/1972 | Lewis et al. | 251/63.6 |

FOREIGN PATENT DOCUMENTS 954080 12/1949 France ..................... 92/85 R

Primary Examiner—Martin P. Schwadron
Assistant Examiner—G. L. Walton
Attorney, Agent, or Firm—McGlew and Tuttle

[57] ABSTRACT

A shutoff device comprises a housing having a closable flow passage which is closed by a closing plate member which moves into a recess defined in said housing forming a receiving seat. The closing plate member is closed by the movement of a fluid pressure operated piston which moves the closing plate member rapidly into the closed position. In order to prevent the closing plate member from slamming into the valve seat and damaging the valve seat, there is provided a bolster member in the form of a stop which is disposed in the path of movement of a stop face connected to a piston rod of the fluid pressure's piston which is connected to the closing member. The bolster member is made of a material which is non-elastic but which deforms after it is contacted by the stop face to initially stop the closing plate member and is then deformed to permit final closing of movement of the closing plate member into a completely closed position engaged in the recess seat and also to absorb the closing force by its own deformation.

7 Claims, 3 Drawing Figures

EXPLOSION BARRING SHUTOFF DEVICE

FIELD AND BACKGROUND OF THE INVENTION

This invention relates in general to the construction of devices for closing off fluid flows and in particular to a new and useful device for preventing damage of a closing valve member which is moved rapidly into engagement with a closing seat by construction which includes a bolster stop face which is engaged by a moving part driving the closing member to stop the movement thereof and to thereafter deform and absorb the shock of rapid stopping.

The subject matter of the invention is an explosion barring shutoff device including a working-fluid-operated shutting member, of the kind used as safety devices in pipe lines for conducting fluid media (gases, liquids, dusts) which, under certain operating conditions, tend to explode. Such a shutoff device (gate or disc) is responsive to a flame alarm provided upstream of the device and is intended to shut off the conduit within a time so short as to prevent a propagation of the explosion beyond the shutting member. It is known to close gate members of this kind by means of suitable working fluid, for example nitrogen or air, and closing times of 40 to 50 milliseconds have been achieved. Depending on the inflammability of the medium or the speed of propagation of the explosion, the flame alarm must be provided relatively far in advance of the gate, which means that relatively long sections of the pipe line remain unprotected. Shorter shut-off times may help. However, since such devices ordinarily comprise relatively large closing plates or discs, and thus a big mass to be moved, not only correspondingly high working-fluid pressures are needed to obtain the necessary short closing time, but also impact forces of such power are produced that the shutting member and its seats, or the provided seals, may easily be destroyed, and the entire housing for the shutting member must be made sufficiently massive and resistant, at considerably high expense.

The present invention is directed to a shutoff device for cutting off the flow of fluid media making it possible with a minimum of expenses to obtain far shorter closing times as compared to the equivalent prior art devices and causing no destruction of component parts which would affect the further shutoff function.

The invention relates particularly to an explosion barring shutoff device with a working-fluid-operated shutting member. The actuating member which transmits the closing force of the working fluid to the shutting member is coupled to the shutting member and the coupling is designed as a stop, cooperative during the final fraction of the closing stroke of the shutting member, with a bolster. The bolster is supported on the housing of the device and is made of non-elastic material capable of permanent plastic deformation and it is deformed by the stop during the final fraction of the closing stroke of the closing member while absorbing the impact energy of the shutting member.

Lead has proved particularly advantageous as the bolster material. Taking into account the stop faces, the moved mass of the closing member, and the driving force, the mass and thickness of the bolster (in the direction of motion of the closing member) can be determined to the effect that following the impact of the stop on the bolster and upon a correspondingly non-elastic deformation of the latter, the shutting member stops exactly in the closing position. Because of the completely non-elastic deformation of the bolster, no forces are produced, neither in the housing supporting the bolster nor in the coupling member or the closing member, which would cause destructive shocks. Experience has shown that with a proper arrangement alone of the stop and the bolster in accordance with the invention, thus without a special reinforcement of the component parts of the device, even conventional gates or discs which are not intended as safety members, may be adapted to provide a perfectly operating explosion-proof shutoff device which can repeatedly perform its closing function, merely upon exchanging the deformed bolster.

Accordingly, it is an object of the invention to provide in a shutoff device which comprises a housing having a closable flow passage, a recessed seat to which a valve closing plate member is movable to a closed position from an open position spaced from the seat and which also includes a fluid-operated piston or similar device which is connected to the closing plate to move it to the closed position, the improvement which comprises a stop defined between the connection of the piston to the closing member in the housing which includes a stop face movable with the piston and the closing member and a stop bolster made of a non-elastic deformable material disposed to engage the stop and interrupt the movement of the piston immediately before the closing member engages on the seat and wherein the bolster member is deformable to permit further closing movement of the closing member into engagement with the seat upon the plastic deformation of the bolster which absorbs the impact of the stopping.

A further object of the invention is to provide an arrangement for stopping the instantaneous movement of a closing device permitting subsequent further closing movement and absorbtion of a shock of the interrupting of the movement.

A further object of the invention is to provide a fluid flow control device which operates substantially without shock which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
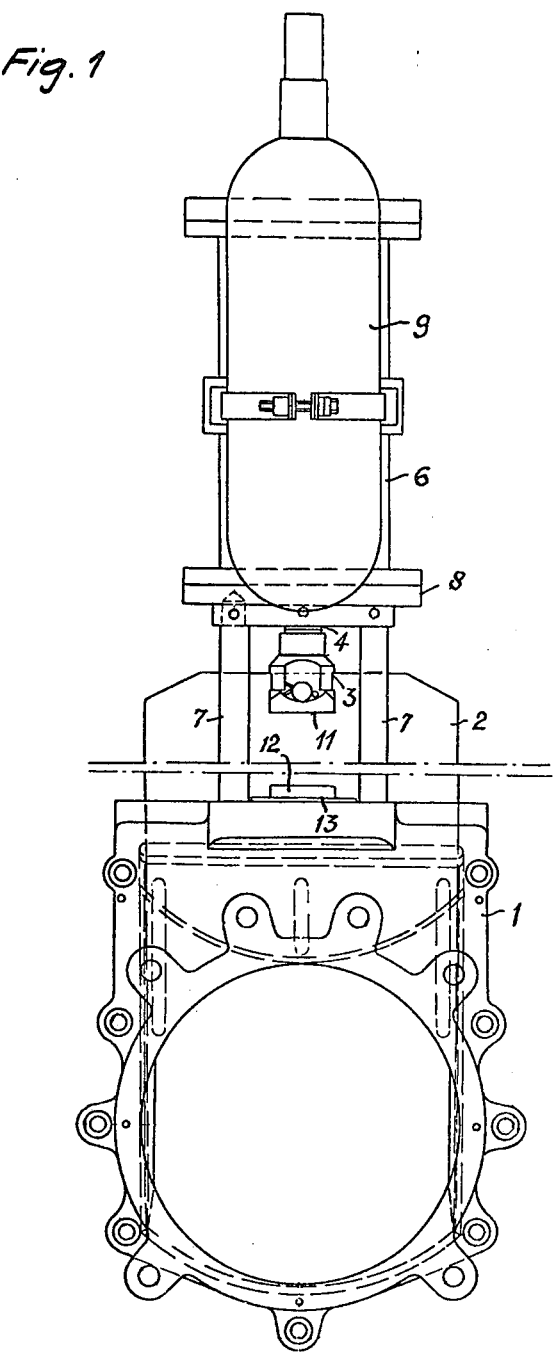
FIG. 1 is a side elevational view of an explosion-barring gate with a linearly movable shutting place in open position and constructed in accordance with the invention.

Referring to the drawings, in particular the invention embodied therein, comprises an explosion-barring shutoff device which is in the form of a fluid flow control valve which comprises a housing 1 having an opening therethrough for the passage of fluid which is closed by a shutting member or valve member 2.

The shown shutoff device comprises a two-part housing 1 in which a shutting plate 2 having smooth, mutually parallel opposite side surfaces and a beveled lower closing edge 2a, is mounted for displacement. Plate 2 extends perpendicularly to the flow direction and between the housing parts 1a and 1b and projects upwardly out of the housing, where it is secured, with a limited angular motion, through a coupling 3 to a piston rod 4. Piston rod 4 carries a piston 5 which is guided in a cylinder 6. The cylinder 6 is mounted on a supporting plate 8 resting on columns 7, which, in turn, are supported on the top of the housing 1. Laterally of cylinder 6, a working-fluid tank 9 is provided which is connected to the cylinder, in a manner known per se, through a feed line 20 under the control of a flame alarm (not shown).

Figure 2:
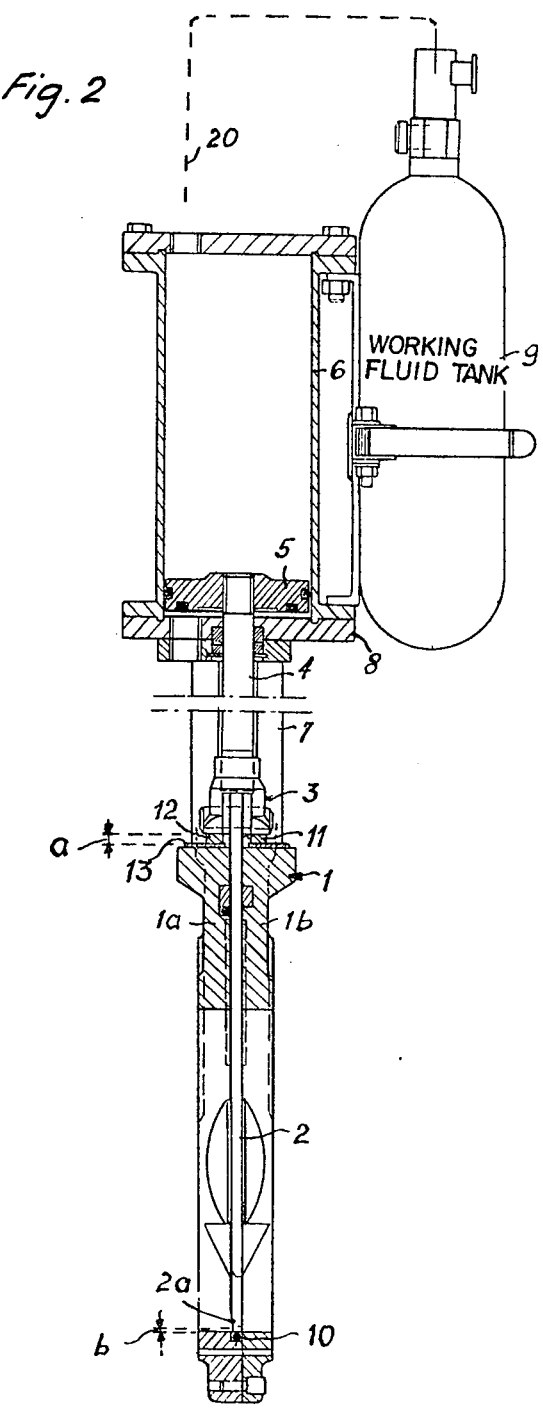
FIG. 2 is an axial sectional view of the device of FIG. 1, shortly before the closing positon.
Figure 3:
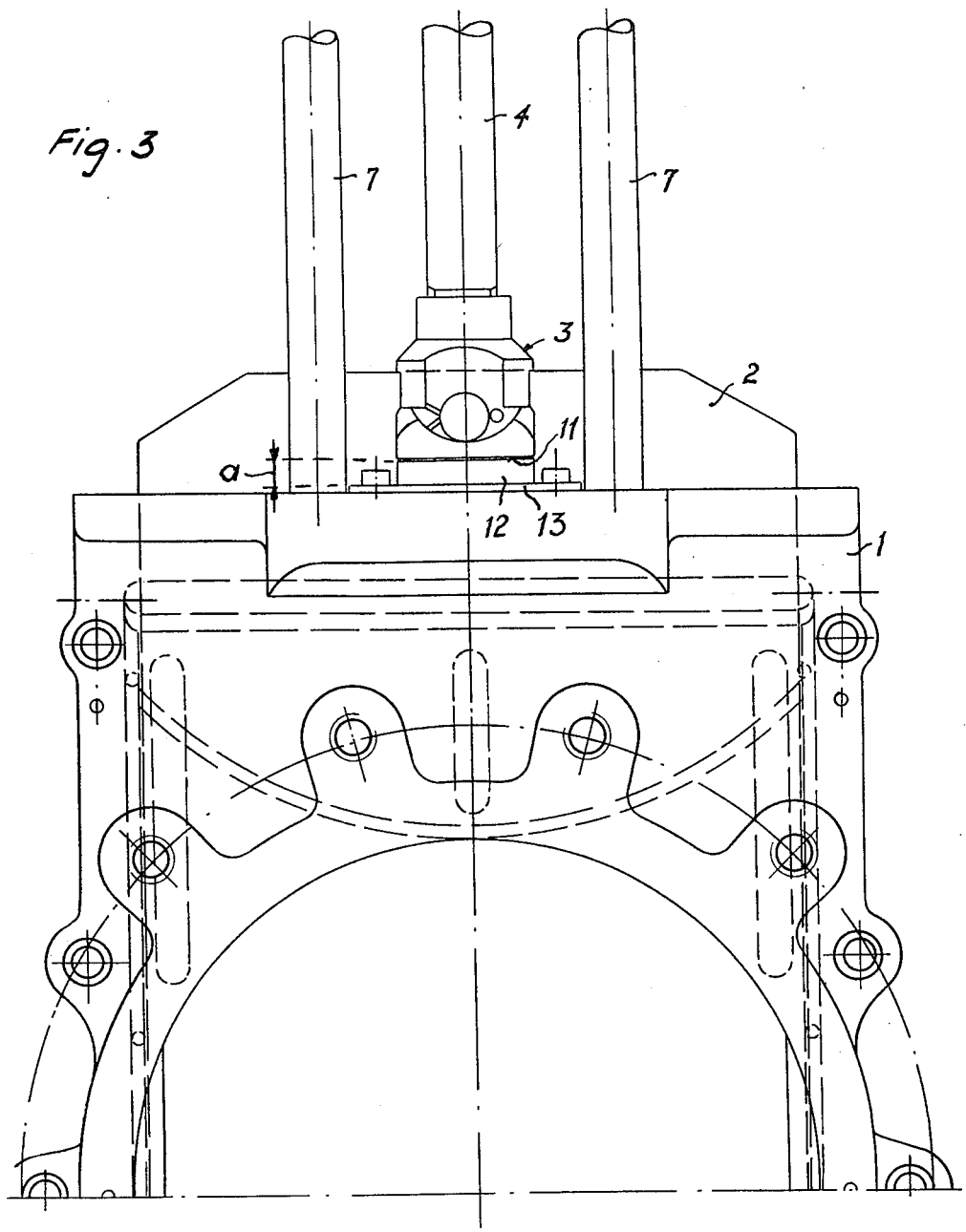
FIG. 3 is an enlarged elevational view similar to FIG. 1 only with the gate in the position according to FIG. 2.

As shown in FIG. 2, the circular-section closing edge 2a of shutting plate 2 is intended for cooperation with a seal 10 which is received in a groove of the housing 11, and is to be compressed to a small extent by the shutting plate 2 when the plate is in a closing position. The closing stroke of piston 5, of course, must be sufficient to permit shutting plate 2 to attain this desired end position. Since with the enormous closing speed of shutting plate 2 under the action of the working fluid (advantageously compressed air), an unimpeded shutting motion would cause an impact inevitably destroying the seal 10 as well as the housing or the plate itself, a stop must be provided limiting the motion of the plate. It appears that piston 5 cannot cooperate with the cylinder bottom as a stop, nor can some other rigid stop be provided, for example on the housing, for determining the closing position; any such abrupt blocking of the plate motion by fixed stops would inevitably lead to a destruction of the stops or the housing or the moved parts of the gate. A corresponding reinforcement of piston 5, piston rod 4, coupling 3, and shutting plate 2 is prohibitive already because of the augmented moving mass resulting therefrom and further intensifying the shocks, while a reinforcement of the housing would require an unproportionate volume and weight of the shutting member. In addition, rigid stops, as well as elastic ones, would cause the shutting plate to rebound and thus prevent a perfect and instantly continuous closure.

To make it possible to obtain very short closing times, such as of 25 milliseconds, even with quite ordinary, i.e. not specially reinforced, shutting members, which otherwise would result in correspondingly high impact forces, the following is provided in accordance with the invention:

At both sides of shutting plate 2, coupling 3 is provided with stop faces 11 opposite to the housing. On the even top side of the housing, two bolster blocks 12 of lead are mounted which are intended to cooperate with stop faces 11. The height a of these blocks 12 somewhat exceeds the distance b by which closing edge 2a of shutting plate 2 is spaced from its final closing position at the instant at which stop faces 11 of coupling member 3 impinges on bolster blocks 12 (FIG. 2). The cross-section or the mass of bolster blocks 12, which are identical with each other, are chosen to the effect that as shutoff plate 2 is driven into its closing position, upon clearing the supply of working fluid into cylinder 6 in response to a signal from the flame alarm, stop faces 11 of coupling member 3 cause a plastic deformation of bolster blocks 12 and reduce their height exactly by the distance b. Considering that in practice, lead blocks 12 do not exhibit any elasticity, the entire impact is absorbed by their permanent deformation. There is no risk of any rebounding of the shutting plate, or of producing forces which would destroy seal 10 or housing 1.

As material for the bolster blocks, of course, certain lead alloys or other non-elastic materials undergoing permanent deformation may also be used. What is substantial is only to have bolster blocks which are capable of practically completely absorbing the impact energy produced during the desired short closing time of 20 to 30 milliseconds needed for covering the final fraction of the closing motion of the shutting plate, by their plastic deformation alone.

After the deformation, the supporting plates 13 for block 12 which, in the shown example, are firmly screwed to housing 1, can easily be removed and exchanged for plates carrying new blocks 12.

It should finally be noted that the inventive idea of impact energy dissipation and motion limitation by means of bolsters subjected to permanent plastic deformation may also be applied to explosion-barring shutoff discs, or wherever the shutting member is to be brought into its correct closing position abruptly. In the event of a disc, an exchangable bolster block, for example of lead, would be provided on the housing, and plastically deformed by a stop of the coupling member provided between the disc and an actuating member, during a final fraction of the pivotal motion of the disc.

While specific embodiments of the invention have been shown and described in detail to illustrate the application of the principles of the invention, it will be understood that the invention may be embodied otherwise without departing from such principles.

What is claimed is:

1. In a shutoff device comprising a housing having a closable flow passage, a valve seat, a closing member movable in the housing from an opened position permitting flow through the passage to a closed position engaged on the valve seat and blocking the flow, and means for rapidly moving the closing member into a closed position having a movement connected to the closing member, the improvement comprising stop means defined between the movement member and the housing including a stop face and stop bolster made of a non-elastic deformable material disposed to engage and stop the movement member immediately before the closing member engages on the seat, said bolster being deformable to permit further closing movement after initial engagement with said stop face to permit further completely closed movement and positioning of the closing member, the deformation of said bolster occurring to absorb the impact of the closing movement to prevent damage of the closing member and the valve seat.

2. In a shutoff device according to claim 1 wherein said closing member comprises a disc shutted pivotal at right angles to the flow direction wherein said stop means includes said bolster which is exchangeably secured to said housing.

3. In a shutoff device according to claim 1 wherein said means for moving said closing member comprises a fluid operated piston connected to said movement member and including a stop face defined thereon, a bolster member mounted on said housing in the path of movement of said stop face being of a deformable material when engaged by said stop face will be deformed to permit a further closing movement of said closing member.

4. In a shutoff device according to claim 1 wherein said housing includes a gate valve housing, said closing member comprising a gate valve movable in said housing having an annular portion engageable in an annular recess of said housing forming the valve seat, and said movement means comprising a fluid pressure operated piston, the piston being connected to said gate member and a stop face defined on said connection forming said stop means along with said bolster mounted on said housing and made of said non-elastic deformable material.

5. In a shutoff device according to claim 1, wherein said closing member comprises a shutting plate which is movable perpendicular to the flow direction, said bolster comprising two blocks which are exchangeably connected to the housing permitting exchanging of said blocks, said stop face defined on said movement member and engageable with said blocks.

6. In a shutoff device according to claim 1, wherein said bolster is made of a material chosen from the group consisting of lead and lead alloys.

7. In a shutoff device according to claim 1, wherein the movement member is connected to the closing member through a coupling, said stop face defined on said coupling.

* * * * *